United States Patent [19]
Dabney

[11] 3,802,463
[45] Apr. 9, 1974

[54] FLOW CONTROL APPARATUS

[75] Inventor: William C. Dabney, Oakland, Calif.

[73] Assignee: Cutter Laboratories Inc., Berkeley, Calif.

[22] Filed: July 31, 1972

[21] Appl. No.: 276,584

[52] U.S. Cl. ................................ 137/625.3, 251/6
[51] Int. Cl. ............................................ F16k 7/06
[58] Field of Search ........................... 251/4–10; 137/625.3

[56] References Cited
UNITED STATES PATENTS

| | | | |
|---|---|---|---|
| 3,685,787 | 8/1972 | Adelberg | 251/6 |
| 3,477,454 | 11/1969 | Fields | 251/4 X |
| 3,630,481 | 12/1971 | McGay | 251/6 |

Primary Examiner—Alan Cohan
Assistant Examiner—Richard Gerard
Attorney, Agent, or Firm—Gardiner, Sixbey, Bradford & Carlson

[57] ABSTRACT

A flow control apparatus is disclosed for regulating fluid flow through flexible tubing, wherein opposed walls of the tubing are variably compressed to modify the size of a pair of lumens formed along the outer edges to thereby minimize "cold flow" of the tubing material. In one embodiment, a roll clamp is provided with a body member having a tapered or contoured first surface for supporting the tubing and a roller having a tapered second peripheral surface, said first and second surfaces being arranged to variably compress the central portions of the tubing as the roller is moved along the body member. Second and third embodiments are also disclosed in which only the first surface and second surface, respectively, are tapered.

21 Claims, 16 Drawing Figures

PATENTED APR 9 1974 3,802,463

FLOW CONTROL APPARATUS

BACKGROUND OF THE INVENTION

This invention relates to clamp means for regulating fluid flow through flexible tubing and, more particularly, to clamp means for the control of parenterally administered solutions.

Many varieties of clamps have been utilized for the purpose of controlling the rate of flow of fluids administered to patients through plastic tubing attached to the fluid supply container and to the patient. Prior clamps have in general lacked the degree of reliability and accuracy deemed necessary for sufficiently precise regulation and maintenance of uniform flow rates over extended periods of time.

There are two major drawbacks to most prior art clamps which contribute to lack of reliability and control. Most clamps are designed to flatten tubing so that the walls of the tubing are more or less parallel producing a long flat oval shaped lumen. Compressing small diameter tubing to such a configuration, even though the height of this lumen may be significantly decreased by further clamping action, does not greatly reduce the rate of flow of fluid through the lumen. Precise changes in rate of flow are thus difficult to achieve. With such clamps, considerable compression of the walls must be applied until the two flat walls almost meet before one can obtain the slow rates of flow usually desired. In such a configuration, the tubing at the outer edges is bent back on itself so sharply that there is considerable strain imposed on the plastic. Under such strain, most plastics undergo the phenomenon of "cold flow" and will actually flow into an available space to relieve the strain. This causes the tubing to flatten still further and fluid flow rates to diminish. Thus frequent attention must be directed to maintaining relatively constant fluid flow by readjustment of the clamping member.

Most tubing used in sets for the administration of parenteral solutions is made of polyvinyl chloride (PVC) which has the tendency to take a set when compressed for prolonged periods of time. Accordingly, unduly long time lags frequently occur when prior art clamps are released after a prolonged compression before the plastic overcomes the set. Some formulations of PVC are worse than others in this respect. Certain plastic tubing, for example polyethylene tubing, can be permanently deformed when compressed so that it is bent sharply at the outer edges. With such tubing it may be impossible to reestablish a greater flow rate.

A few clamps have been developed which do not flatten the tube uniformly but are designed to confine the tubing in a manner which creates a smaller, more or less circular lumen. One such clamp described in Medical World News, Vol. 11, No. 35, p. 16–17 (1970), consists of a base having a tapering V-shaped groove into which plastic tubing is progressively compressed as a roller moves over the tubing. The roller compresses the two outer edges tightly together so that the only available space into which the tubing can go is into the progressively smaller groove. The centrally located lumen of the tubing becomes progressively smaller as more of the outer edge portions are squeezed together. Compressed in such a clamp, there is essentially no space for the plastic to "cold flow" into since all peripheral surfaces of the tubing are confined. It is stated that more constant fluid flow rates are achieved with this clamp. However, since the plastic is under considerable compression and is being bent sharply with such a clamp, it suffers the same drawback as other clamps with respect to being slow in reestablishing a faster flow rate.

SUMMARY OF THE INVENTION

The above problems are overcome by the present invention which provides means to maximize the controllability of fluid flow through flexible tubing as a result of minimizing pressures exerted against the tubing. It is a primary object of the present invention to provide compression means which first move opposite walls of flexible tubing towards each other until the central portions of each wall contact each other. The compression means then brings said opposite walls together in gradually increasing interior surface contact so that, in the centrally flattened tubing, the lumens remaining are more or less rounded at the uncompressed outer edges and those lumens continue to decrease in size until flow of fluid through the tubing ceases. Essentially, the objective is to cause the walls of the tubing to assume a shape similar to that which would occur if the tubing were to collapse of its own accord, as for example when under differential fluid pressure. It is a further object of this invention to provide means which greatly minimizes "cold flow" of the flexible tubing as a result of the contacting walls being only under slight compression, while those portions of the walls forming the lumens are under no compression at all. It is another object of the present invention to provide means for generating uniform flow rates of fluid passing through tubing over extended periods of time. Finally, it is an object of this invention to provide a manner of compression which will permit flow rate increases to be quickly reestablished following prolonged compression of the tubing.

The flow control apparatus of the present invention which accomplishes these objectives includes a body member having a first surface or platform on which the tubing rests longitudinally. A movable member having a second peripheral surface which engages the opposite side of the tubing is positioned relative to the platform so that as it moves, the tubing is compressed slightly. Either the edges of the peripheral surface of the movable member or the edges of the platform are progressively contoured, or both may be contoured in combination. Because of the contoured edges of the movable member or platform, or both in combination, the tubing is compressed so that the walls of the central portion of the tubing make contact with each other, leaving the outer portions uncompressed and forming a more or less rounded lumen at each outer edge of the tubing. As the movable member is further actuated, the walls of the central portion make ever widening contact with substantially no increase in pressure on the walls. Concomitantly, the space in the lumens progressively decreases until no lumens remain. Fluid flow through tubing confined to such a configuration may be adjusted to a rate which is essentially constant over a prolonged period of time since the tubing is under the least amount of stress in this configuration and does not have to readjust and result in dimensional changes of the lumen.

The flow control apparatus of this invention is a considerable improvement over prior art clamps which create a narrow slot like lumen in tubing in that the size of the lumens formed thereby at the outer edges of the tubing are less altered by the same amount of movement of the movable member so that fine adjustments of flow rate are possible. As a result of minimal stress imposed on the tubing by the flow control apparatus following prolonged clamping of the tubing thereby, a faster flow rate may be quickly established since the plastic of the tubing has not been subjected to pressures which cause significant set or deformation.

These and other objects and advantages of the present invention will become readily apparent upon a consideration of the following specification taken in light of the accompanying drawings in which.

DESCRIPTION OF THE PREFERRED EMBODIMENTS

Figure 1:
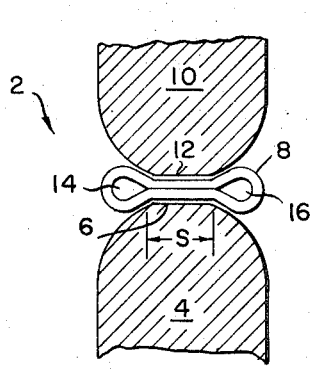
FIG. 1 illustrates compression of a flexible tubing according to the principle of the present invention.
Figure 2:
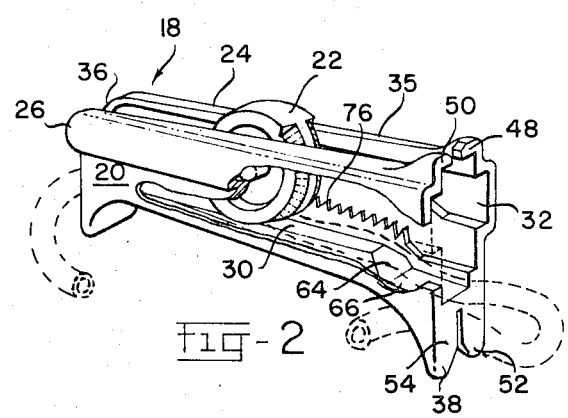
FIG. 2 is a perspective view partially broken away showing one preferred embodiment of the flow control apparatus of the present invention.
Figure 3:
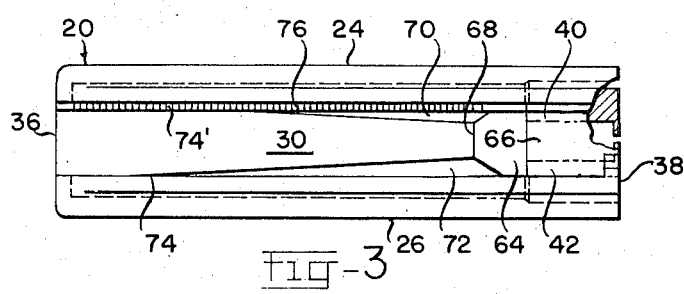
FIG. 3 is a top plan view partially broken away, of the body member of the flow control apparatus of FIG. 2 with recessed slots shown in phantom.
Figure 4:
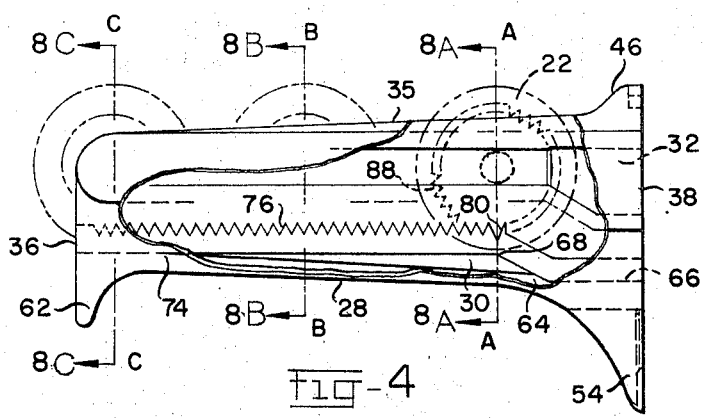
FIG. 4 is a side elevational view partially broken away, of the invention of FIG. 2 with the roller in phantom.
Figure 5:
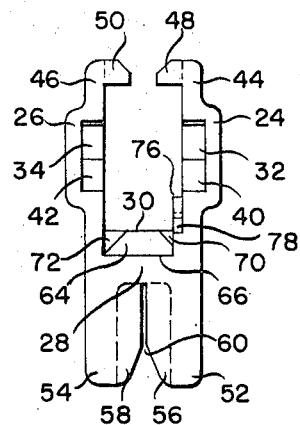
FIG. 5 is an end view of the body member of the invention taken from the right side of FIG. 2.

For purposes of illustrating the basic operating principles of this invention, reference is made to FIG. 1 wherein a flow control apparatus 2 is disclosed which includes a base 4 having a supporting surface 6 for a compressible flexible tube 8 and a clamping member 10. Clamping member 10 includes a compressing surface 12 for bringing opposed upper and lower portions of the tubing together. By this arrangement, rounded lumens 14 and 16 are formed along each side of the flexible tubing, and these lumens may be varied in diameter by increasing or decreasing the lateral dimension S of surfaces 6 and 12. With this arrangement, neither tubing side wall is bent back upon itself during compression, and the amount of "cold flow" is minimized. Thus, fluid flow rate "drift" from a pre-established set position is virtually eliminated. In addition, since the lumens formed in the outer edges are more or less rounded, flow rates of fluid passing therethrough can be changed much more precisely and quickly by causing relatively small changes in the diameter of these lumens.

FIGS. 2–8C illustrate one embodiment of the present invention as applied to the construction of flow control apparatus 18 including a body member 20 and a roller 22. The body member 20 is preferably made of relatively rigid plastic or metal and is generally elongated, having generally parallel side walls 24 and 26 integral with a bottom wall 28 (FIG. 5) having a supporting surface or platform 30. Slots or recesses 32 and 34 running longitudinally and essentially parallel to platform 30 are located in side walls 24 and 26 close to the upper body edge 35 (FIG. 4) opposite the platform 30. These slots 32 and 34 begin near the rear end 36 of the body member and extend to the forward end 38. Near the forward end portion of the sides 24 and 26, the slots 32 and 34 slope towards platform 30, providing ramps 40 and 42, at which point the slots are wider and then level out to the end 38. Projecting upwardly for a short distance from the edge 35 of the sides 24 and 26 at the forward end 38 are short tabs 44 and 46 from which projections 48 and 50 extending inwardly. These projections 48 and 50 do not meet so that the area between side walls 24 and 26 of body member 20 is completely open. Opposite to the tabs 44 and 46 at the forward end 38, are elongated tabs 52 and 54 which are extensions of sides 24 and 26. These tabs 52 and 54 have thin flanges 56 and 58 extending inwardly at the very forward end 38. However, these flanges do not meet so that a narrow Y-shaped slot 60 is formed therebetween. At the rear end 36 of the body member is an extension 62 which projects below the platform 30.

The platform 30 extends essentially parallel with the slots 32 and 34 for most of its length. However, at a point near the forward end 38, the platform 30 slopes to provide a ramp 64 which then levels out to provide a flat surface 66. The distance between surface 66 and the inner edge of projections 48 and 50 is slightly more than the diameter of roller 22.

The top of ramp 64 and the platform 30 intersect along an edge 68 terminated at each end by a pair of cutaway portions between the platform 30 and side walls 24 and 26. These cutaway portions provide tapering grooves or channels 70 and 72 which are deepest at edge 68 and taper uniformly to less depth until they reach the level of the top surface of platform 30 at points 74 and 74' near the rear end 36 of body member 20. Besides tapering in a vertical manner, the channels 70 and 72 uniformly taper in width so that the platform 30 is narrowest at edge 68 at the top of the ramp 64 and uniformly widens until channels 70 and 72 terminate at points 74 and 74'. These channels 70 and 72 may have other configurations, such as curved walls and/or rounded edges where the platform 30 and wall of the channels meet rather than the sharp edges and flat sloping walls shown in this embodiment.

A row of teeth 76 aligned vertically along a line parallel to and close to the platform 30 is located on a shelf 78 (FIG. 5) projecting slightly inwardly from side 24. These teeth 76 are uniformly spaced and the depressions between each tooth is of a uniform depth except for a depression 80 located in approximate alignment with edge 68 of platform 30. The depression 80 serves as a pre-setting means for positioning the roller 22 as will be described later. The number of teeth 76 may vary; in this embodiment there are approximately 30 teeth; however, the number should approximate the number of matching teeth found on the roller 22.

Figure 6:
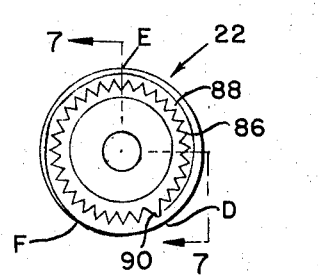
FIG. 6 is a side elevational view of the roller of FIG. 2.
Figure 7:
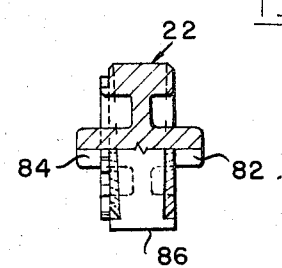
FIG. 7 is an end view, partially in section, taken on the line 7—7 of the roller of FIG. 6.
Figure 8A:
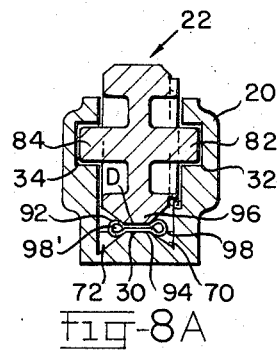
FIG. 8A is a cross-sectional end view taken on the line 8A—8A of FIG. 4 with the roller in position A, showing tubing partially compressed.

Roller 22, as illustrated in FIGS. 6 and 7, is made of rigid material, preferably plastic or metal. The roller 22 has axially located trunnions 82 and 84 designed to fit in a slightly loose manner, into the slots 32 and 34 of body member 20. The peripheral surface 86 of the roller at the widest portion thereof is of a width approximately the same as the widest portion of platform 30 of body member 20. The diameter of the roller is generally larger than rollers of prior roller clamps and is slightly less than the distance between surface 66 and the inner edge of projections 48 and 50 at the forward end of the body member.

Figure 8C:
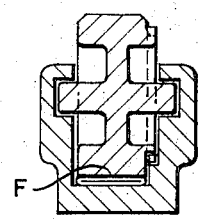
FIG. 8C is a cross-sectional end view taken on the line 8C—8C of FIG. 4 if the roller were in position C, showing tubing completely closed.

A major portion of the peripheral surface 86 of roller 22 is contoured as illustrated in FIGS. 2, 6, 7, 8A, 8B and 8C. That is, the edges are beveled, starting with the widest bevel at point D (FIG. 8A) and progressively and uniformly decreasing in bevel size to an intermediate width E (FIG. 8B) and finally to the no bevel width at point F (FIG. 8C). This arrangement provides a peripheral surface on the roller which varies in width from the narrowest width at point D, progressing to a greater width at point E and subsequently to maximum width at point F. The peripheral surface may be smooth or it may be slightly knurled. In place of the beveled edge shown in this embodiment, the contoured edge may be more or less rounded.

Located on one side of roller 22 a short distance below the peripheral surface 86 is a circumferentially arranged series of teeth 88 radially directed (FIG. 6). These teeth match the size and approximately the number of teeth 76 of body member 20. There is one larger or presetting tooth 90 which projects outwardly more than the teeth 88 and which matches the depression 80.

In the operation of the flow control apparatus, a flexible tubing 92, such as from a parenteral solution administration set, is placed on the platform 30 of body member 20. Roller 22 is inserted at the forward end 38 by inserting the trunnions 82 and 84 in the slots 32 and 34. The roller is then pushed forward and positioned so that pre-setting tooth 90 on the roller engages the depression 80 of the tooth row 76 on the body member 20. At this position (position A shown in FIG. 4), the tubing 92 is compressed and assumes a configuration similar to that shown in FIG. 8A. The two contacting walls 94 and 96 are only under slight pressures since the distance between the peripheral surface 86 of the roller and the surface of the platform 30 is slightly less than twice the thickness of the wall of the tubing 92. Also, the surfaces 30 and 86 essentially match in width at this point so that they compress slightly the central portion of tubing 92 for only a width approximately the same as the width of surface 86 on the roller. The uncompressed "floating" outer edges of the tubing form a pair of small more or less rounded lumens 98 and 98' through which the fluid may flow. The tubing 92 is under the least possible strain in this configuration since there is no pressure being exerted on the walls of the two outer edges thereof. The roller 22, by means of the engagement by teeth 88 with the depressions between teeth 76 of the body 20, may be rolled forward to any position, as for example, to point E (FIG. 8B), where the the lumens 98 and 98' become smaller and the flow rate through the tubing will be significantly decreased. At whatever point the roller contacts the tubing as it moves down the body member, the width of the contacting surface of the roller is essentially the same width as the width of platform 30 on which the tubing rests. There is essentially no increase in pressure exerted on the walls of the tubing so that "cold flow" of the plastic in the tubing is still minimal. Flow rates of fluid passing through the tubing essentially remain constant over extended periods of time at any established position of the roller, there being essentially no dimensional changes in the tubing resulting from "cold flow" since the internal stresses caused by distortion of the tube from its normally rounded shape have been minimized. Flow of fluid through the tubing may be shut off completely by positioning the roller approximately at a point F along the body where compression of the tubing as shown in FIG. 8C occurs. Here the full width of the roller 22 and platform 30 are available to confine the tubing 92. If one desires to re-establish a greater rate of flow of the fluid, particularly when the roller has been positioned for a slow rate for a prolonged period of time, the roller is moved back toward end 38. A faster, essentially uniform rate of flow is quickly obtained since the tubing has not been under undue compression to cause it to "set." The roller 22 is not easily dislodged from any given position since the compressed tubing, even though only under slight pressure, offers some frictional resistance against the roller. This mild resistance plus the fact that some of the teeth of the roller and body member are meshed, combine to help prevent the roller from being dislodged accidentally. In addition, since the distance between the roller and the platform is essentially the same over the entire path the roller takes, there is little or no tendency for the roller to become less engaged at any point to allow a dangerously high rate of flow of fluid as is the case with many prior art clamps which are characterized by variable distances between the roller and the platform.

Figure 9A:
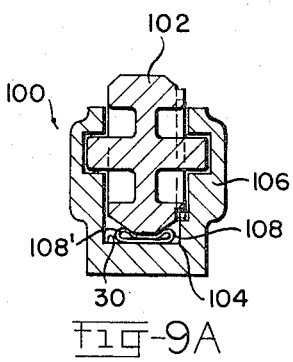
FIGS. 9A, 9B and 9C illustrate similar degrees of compression of tubing as in FIGS. 8A, 8B and 8C, but as they appear with a second embodiment of the flow control apparatus of the present invention.
Figure 8B:
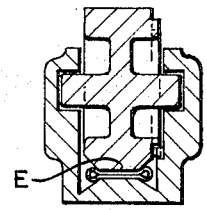
FIG. 8B is a cross-sectional end view taken on the line 8B—8B of FIG. 4 if the roller were in position B, showing tubing more widely compressed.
Figure 9B:
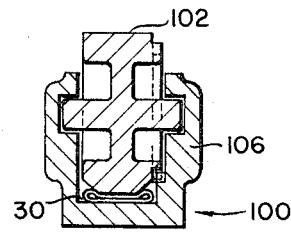
Figure 9C:
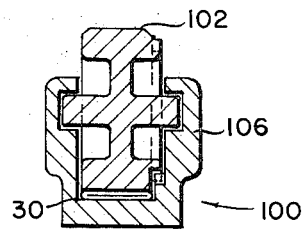

Another embodiment of the present invention which embraces the same principles of providing clamping action on tubing with the least pressure deforming characteristics, is the flow control apparatus 100 (FIGS. 9A, 9B and 9C) which is identical to apparatus 18 described above except that the platform 30 of body member 106 has no channels 70 and 71. In other words, the width of platform 30 is the same for the full length of the body 106. The action of the contoured roller 102 on flexible tubing 104 placed in body member 106 may be seen in FIGS. 9A, 9B and 9C. Two lumens 108 and 108' are formed in the tubing 104 which in this embodiment, will be somewhat teardrop in shape. There is essentially no difference in strain on the tubing using the clamp of this embodiment from the minimal strain imposed on the tubing by embodiment 18.

Figure 10A:
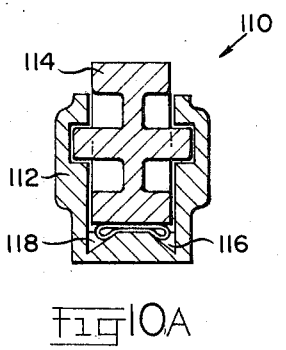
FIGS. 10A, 10B and 10C illustrate similar degrees of compression of tubing as in FIGS. 8A, 8B and 8C but as they appear with a third embodiment of flow control apparatus of the present invention.
Figure 10B:
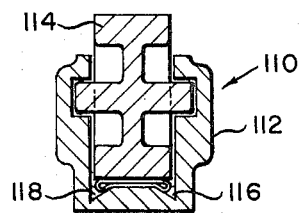
Figure 10C:
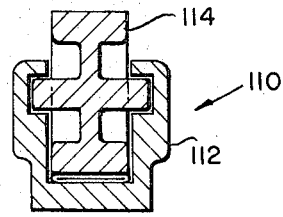

Still another flow control apparatus embodiment 110 (FIGS. 10A, 10B and 10C) of the present invention which is somewhat different from embodiments 18 and 100 in structure, also produces clamping action on flexible tubing according to the concept of effecting minimal deformation and the formation of uncompressed outer edges of the tubing. In this embodiment 110, neither the body member 112 nor the roller 114 has teeth for guiding the roller through the body in an established manner. Also, the roller 114 is not contoured with a beveled edge but has a uniform width throughout its circumference. The body member 112, however, does have two tapered channels 116 and 118 similar to the channels 70 and 72 of roller clamp 18. In all other details, embodiment 110 is essentially the same as roller clamp 18. It will compress flexible tubing in a manner as shown in FIGS. 10A, 10B and 10C.

The preceding three embodiments of my invention are illustrative of what I have set out to accomplish, namely, to compress flexible tubing in a manner whereby the walls of inner or central portion of the tubing come together and the outer edges of the tubing remain uncompressed and unconfined so that more or less rounded lumens are formed in these uncompressed edges.

With any of the three embodiments of the present invention, certain additional features lend themselves to greater ease in the operation of the device. For example, the projections 52, 54 and 62 assist in keeping the operator's fingers from slipping off the body member as the thumb moves the roller so that the device remains securely in the grasp of the operator. The Y-shaped slot 60 provided at the forward end 38, which is part of the extensions 52 and 54, is convenient for providing means to shut off the flow of fluid quickly when the tubing is wedged into this slot.

Whereas, in the embodiments described above, the peripheral surface of the roller and the platform on which the tubing rests are essentially the same distance apart for most of the length of the body member, this distance need not be uniformly the same. For example, the distance between the roller and platform may gradually be made smaller as the roller moves forward without materially changing the desired configuration of the tubing under compression. To accomplish this, the platform may incline slightly from front to back relative to the slots in the sides of the body member into which the trunnions of the roller fit. Alternatively, the platform may be flat and the slots may slope slightly toward the platform from front to back. Although embodiments of the invention have been discussed relative to roller clamps, other forms of clamping means embracing the principle of this invention may be used, there being no restriction to roller clamps. The principle may be applied in a screw clamp, for example. However, roller clamps are far easier to use than screw clamps since the operator can move a roller faster and such clamps require only the use of one hand whereas the movement of a screw is much slower and screw clamps often require the use of two hands.

While in the foregoing specification, embodiments of the invention have been disclosed in considerably detail for purposes of illustration, it will be understood by those skilled in the art that many of these details may be varied without departing from the spirit and scope of the invention.

I claim:

1. Apparatus for controlling the rate of flow of fluid passing through flexible tubing comprising:
a body member having a first surface positioned adjacent one side of said flexible tubing when said tubing is passed longitudinally through said body member,
clamping means movably mountable on said body member to clamp said tubing with a first portion of the wall thereof in contact with said first surface and a second portion of the wall of said tubing compressed into contact with said first portion to leave a pair of lumens along uncompressed outer edges of said flexible tubing, said clamping means including a second surface for externally contacting said second portion of said tubing at a position opposite said first portion to compress said first and second portions into contact, said first and second surfaces being positioned to contact respectively first and second central portions of the wall of said tubing to initially form said pair of lumens, at least one of said first and second surfaces including lumen forming means to alter the size of each of said lumen in response to movement of said clamping means relative to said body member,
and mounting means formed on said body member to receive and mount said clamping means for movement relative to said body member.

2. Apparatus as defined by claim 1 wherein said first surface extends in the longitudinal direction of said tubing extending through said body member, said clamping means being progressively operable within said mounting means along a longitudinal path from a first end of said first surface toward an opposite second end thereof to cause ever widening contact between said first and second portions of said tubing wall with a corresponding progressive decrease in the size of said lumens to a point where the passage of fluid therethrough is no longer possible.

3. Apparatus as defined by claim 2 wherein said body member includes a bottom wall, said first surface being formed on said bottom wall, and a pair of sidewalls integral with said bottom wall, said mounting means includes an opposed pair of slots formed in said sidewalls and extending longitudinally of said body member above and on either side of said first surface, and said clamping means includes a roller having said second surface formed on the periphery thereof, said roller being mounted in said slots.

4. Apparatus as defined in claim 3, wherein said pair of slots are inclined in relation to said first surface, whereby adjacent portions of said first and second surfaces are separated by a distance which is greater at one end of said body member than at the other.

5. Apparatus as defined in claim 3, wherein said pair of slots are parallel with said first surface, whereby adjacent portions of said first and second surfaces are separated by an equal distance as said roller is moved from one end of the body member to the other.

6. Apparatus as defined in claim 5 wherein said first surface includes said forming means, said forming means including a pair of tapered channels formed in said bottom wall extending longitudinally of said body member between said first surface and said pair of side walls, respectively, said channels allowing the lumens to form therein when the flexible tubing is compressed between said first and second surfaces and causing said first surface to be uniformly tapered in width.

7. Apparatus as defined by claim 6 wherein said second surface extends beyond the confines of said first surface to overlie said channels.

8. Apparatus as defined in claim 6 wherein said channels are tapered in both width and depth, each such channel being of maximum depth at the widest point thereof and tapering to minimum depth at the narrowest point thereof.

9. Apparatus as defined in claim 5, wherein said second surface is uniformly tapered in width around at least a portion of the periphery of said roller to provide said forming means, said roller including a pair of progressively and uniformly decreasing bevels along the respective peripheral edges thereof, said bevels starting at the narrowest portion of said second surface and decreasing uniformly to zero at the widest portion of said second surface, whereby said bevels create a space between said first surface and said roller wherein the lumens may form when the flexible tubing is compressed between said first and second surfaces.

10. Apparatus as defined in claim 9 wherein said bevels are rounded.

11. Apparatus as defined in claim 9, wherein said bevels are flat.

12. Apparatus as defined in claim 9 further including interfitting means connected with said body member and said clamping means for producing uniform linear displacement of said roller as said roller is uniformly rotationally displaced, said interfitting means includes a linear train of gear teeth formed on said body member and a mating train of gear teeth formed on said roller.

13. Apparatus as defined by claim 9 wherein said first surface is flat.

14. Apparatus as defined in claim 5 wherein said forming means is provided on said first and second surfaces, said forming means including a pair of tapered channels formed in said bottom wall extending longitudinally of said body member between said first surface and said pair of side walls, respectively, causing said first surface to be uniformly tapered in width, and a pair of progressively and uniformly decreasing bevels along the respective peripheral edges of said roller, said bevels causing said second surface to be uniformly tapered in width around at least a portion of the periphery of said roller by decreasing uniformly from the narrowest portion of said second surface to zero at the widest portion of said second surface, whereby said channels and bevels allow lumens to form when the flexible tubing is compressed between said first and second surfaces.

15. Apparatus as defined in claim 14 including interfitting means connected with said body member and said clamping means for producing uniform linear displacement of said roller as said roller is moved relative to said body means.

16. Apparatus as defined in claim 15, wherein said interfitting means is operative to cause adjacent portions of said first and second surfaces to be equal in width as said roller is rotationally and linearly displaced with respect to said body member.

17. Apparatus as defined in claim 16 wherein said interfitting means includes a linear train of gear teeth formed on said body member and a mating train of gear teeth formed on said roller, one of said trains having an enlarged gear tooth mating with an enlarged depression formed in the other said train, whereby the enlarged gear tooth and depression allows the widths of said first and second surfaces to be matched.

18. Apparatus as defined in claim 17, wherein said enlarged tooth is formed in said mating train of gear teeth and said enlarged depression is formed in said linear train of gear teeth.

19. Apparatus as defined in claim 15 wherein said interfitting means includes a presetting means for positioning the narrowest width of said second surface above the narrowest width of said first surface, said interfitting means operating to maintain the width of said second surface equal to the width of said first surface as said roller moves relative to said body member.

20. Apparatus as defined by claim 3 wherein said first surface is longitudinally inclined relative to said slots.

21. Apparatus for controlling the rate of flow of fluid passing through flexible tubing comprising:
a body member having a first surface positioned adjacent one side of said flexible tubing when said tubing is passed through said body member, said first surface extending in the longitudinal direction of extension of said tubing through said body member,
clamping means movably mountable on said body member to clamp said tubing with a first portion of the wall thereof in contact with said first surface and a second portion of the wall of said tubing compressed into contact with said first portion to leave a lumen along at least one uncompressed outer edge of said tubing, said clamping means including a second surface for externally contacting said second portion of said tubing at a position opposite said first portion to compress said first and second portions into contact, at least one of said first and second surfaces having lumen forming means including a cavity extending along at least one outer peripheral edge thereof formed to uniformly vary the width of the surface including said forming means in the longitudinal direction of said tubing, said lumen forming means operating to alter the size of the contacting area of said first and second tubing wall portions in response to movement of said clamping means relative to said body member to alter the size of said lumen formed by the uncompressed portion of said tube,
and mounting means formed on said body member to receive and mount said clamping means for movement relative to said body member along a longitudinal path from a first end of said first surface toward an opposite second end thereof to cause ever widening contact between said first and second portions of said tubing wall with a corresponding progressive decrease in the size of said lumen formed in said tubing to a point where the passage of fluid therethrough is no longer possible.

* * * * *